United States Patent
Nenonen et al.

(10) Patent No.: US 8,947,450 B2
(45) Date of Patent: Feb. 3, 2015

(54) METHOD AND SYSTEM FOR VIEWING AND ENHANCING IMAGES

(75) Inventors: Petri Nenonen, Tampere (FI); Jaana Parkkinen, Tampere (FI); Ossi Kalevo, Toijala (FI)

(73) Assignee: Nokia Corporation, Espoo (FI)

( * ) Notice: Subject to any disclaimer, the term of this patent is extended or adjusted under 35 U.S.C. 154(b) by 2236 days.

(21) Appl. No.: 11/579,283

(22) PCT Filed: May 30, 2005

(86) PCT No.: PCT/FI2005/050180
§ 371 (c)(1),
(2), (4) Date: Nov. 2, 2006

(87) PCT Pub. No.: WO2005/116922
PCT Pub. Date: Dec. 8, 2005

(65) Prior Publication Data
US 2008/0018660 A1   Jan. 24, 2008

(30) Foreign Application Priority Data
May 31, 2004   (FI) .................................. 20045201

(51) Int. Cl.
*G09G 5/00* (2006.01)
*G06T 3/00* (2006.01)
*G06T 5/00* (2006.01)

(52) U.S. Cl.
CPC ............... *G06T 3/0012* (2013.01); *G06T 5/00* (2013.01)
USPC .............. 345/619; 345/660; 345/670; 345/67

(58) Field of Classification Search
USPC .................... 345/619, 660, 670–672
See application file for complete search history.

(56) References Cited

U.S. PATENT DOCUMENTS

| 5,107,334 A * | 4/1992 | Matsumoto .................. 348/561 |
| 6,195,473 B1 * | 2/2001 | Zable et al. .................. 382/299 |
| 6,331,902 B1 * | 12/2001 | Lin ............................... 358/1.9 |
| 6,522,347 B1 * | 2/2003 | Tsuji et al. .................... 715/848 |
| 6,545,687 B2 * | 4/2003 | Scott et al. .................... 345/629 |

(Continued)

FOREIGN PATENT DOCUMENTS

| EP | 0 891 075 | 1/1999 |
| EP | 1 191 783 A2 | 3/2002 |

(Continued)

OTHER PUBLICATIONS

Choi, C., et al., "An Image Processor for SXGA/UXGA FPD", IEEE Asia Pacific Conf., Aug. 23-25, 1999, ASICs, 1999, AP-ASIC'99, 4 pgs.

(Continued)

*Primary Examiner* — M Good Johnson
(74) *Attorney, Agent, or Firm* — Harrington & Smith

(57) ABSTRACT

The invention relates to method and system for viewing and enhancing images on the display of a mobile device, which includes the display, memory and a processing means for bit images, and an input device for receiving bit images. A bit image is received and processed to a smaller scale in two stages, using pre-selected scaling algorithms, in which the first scaling produces a bit image of an intermediate size and the second scaling produces a second bit image of the size to be displayed. The bit image to be displayed is enhanced. The second bit image is enhanced using an enhancing chain comprising at least two enhancing algorithms.

15 Claims, 2 Drawing Sheets

(56) References Cited

U.S. PATENT DOCUMENTS

| | | | |
|---|---|---|---|
| 6,788,309 B1* | 9/2004 | Swan et al. | 345/629 |
| 6,836,570 B2* | 12/2004 | Young et al. | 382/274 |
| 6,931,661 B2* | 8/2005 | Smith | 725/133 |
| 6,950,561 B2* | 9/2005 | Boroczky et al. | 382/263 |
| 7,009,626 B2* | 3/2006 | Anwar | 345/660 |
| 7,075,558 B2* | 7/2006 | Watanabe et al. | 345/660 |
| 7,222,306 B2* | 5/2007 | Kaasila et al. | 715/801 |
| 7,337,396 B2* | 2/2008 | Rosenholtz et al. | 715/273 |
| 7,362,910 B2* | 4/2008 | Asari et al. | 382/254 |
| 7,385,615 B2* | 6/2008 | Vale et al. | 345/660 |
| 7,391,932 B2* | 6/2008 | Jeon | 382/298 |
| 7,418,673 B2* | 8/2008 | Oh | 715/838 |
| 7,433,544 B2* | 10/2008 | Lin et al. | 382/299 |
| 2001/0032221 A1* | 10/2001 | Anwar | 707/527 |
| 2002/0000998 A1* | 1/2002 | Scott et al. | 345/667 |
| 2002/0122603 A1* | 9/2002 | Boroczky et al. | 382/263 |
| 2002/0172419 A1 | 11/2002 | Lin et al. | 382/167 |
| 2003/0191756 A1 | 10/2003 | Oh | 707/3 |
| 2003/0197784 A1 | 10/2003 | Bae | 348/207.1 |
| 2004/0001636 A1* | 1/2004 | Miceli et al. | 382/235 |
| 2004/0075673 A1 | 4/2004 | Vale et al. | 345/660 |
| 2005/0088560 A1* | 4/2005 | Kalevo | 348/333.01 |
| 2005/0130703 A1* | 6/2005 | Min et al. | 455/556.1 |
| 2005/0146600 A1* | 7/2005 | Chipchase et al. | 348/14.02 |
| 2006/0031511 A1* | 2/2006 | Salt | 709/227 |
| 2007/0036456 A1* | 2/2007 | Hooper | 382/274 |

FOREIGN PATENT DOCUMENTS

| | | |
|---|---|---|
| EP | 1 351 189 A1 | 10/2003 |
| EP | 1 400 919 A2 | 3/2004 |
| EP | 1 242 975 B1 | 1/2005 |
| JP | 04-270557 | 9/1992 |
| JP | 2003101934 A | 4/2003 |
| JP | 2003-204480 A | 7/2003 |
| JP | 2004-088510 A | 3/2004 |
| WO | WO-01/80178 A2 | 10/2001 |

OTHER PUBLICATIONS

"Algorithm series enhances image quality on mobile displays", Laser Focus World Web Exclusive, May 13, 2004 (Society for Information Display Exh., May 23-28, 2004, Seattle, WA, USA).

Rauschenbach, U., et al., "Interactive focus and context display of large raster images", Proceedings WSCG 2000, Plzen, Czech Republic, Feb. 7-11, 2000.

http://www.research.philips.com/technologies/display/vidprocmobdisp/index.html, kohdat: "Front-of-screen performance improvement for mobile display devices by means of video/image processing" and "Adaptive Colour Gamut Mapping (ACGM), Contrast Boosting and Dynamic Backlight".

* cited by examiner

METHOD AND SYSTEM FOR VIEWING AND ENHANCING IMAGES

BACKGROUND OF THE INVENTION

1. Field of the Invention

The present invention relates to a method and a system for viewing and enhancing images on a display of a mobile device, which includes the display, memory and a processing means for bit images, an input device for receiving bit images, and in which a bit image is received and processed into a smaller scale using a pre-selected scaling algorithm and enhanced using a enhancing algorithm and opened for processing, in which the enhancing includes one or several following procedures: color and contrast enhancement, sharpening, color management, and dithering.

2. Description of the Prior Art

An imaging mobile device can capture and receive images of various sizes. It is required that these images must be able to be viewed on the display of the device. Typically the display is relatively small, both physically and in number of pixels. Therefore, the display size is often relatively small compared to the image size. The image size must be reduced so that the image fits into the display. This requires downscaling or decimation algorithms. Sometimes only part of the image contains interesting information. Varying level of zooming with panning support is required for showing the details at the area of interest. Zooming can be implemented using upscaling or interpolation algorithms. The downscaling and upscaling algorithms must be of an adequate quality. Otherwise artifacts, such as aliasing effects, jagged edges, excessive smoothing or pixelization, will be introduced to images.

Mobile platforms set strict limits on the amount of memory and processing power available for image processing and enhancement algorithms. Large images consume a great deal of memory and processing power. The amount is directly or exponentially relative to the number of pixels in an image. Therefore it may be impossible to view large images on a mobile device.

Another problem with the current generation of mobile displays is insufficient image quality. Especially when images lack properties that produce good image quality, a lack of the same properties in the display module will produce non-optimal perceived image quality. Typically these features include sharpness, contrast, color contrast, and saturation of images. Quantization artifacts may also be visible, due to the insufficient bit depth of displays. These features can be enhanced with image processing means, but the available processing power and amount of memory may limit or prevent utilization of these methods.

The trivial solution for the low-memory problem is to limit the image size that can be viewed with the device. In that case, some images will not be viewed if there is insufficient memory available. This solution is used in many current products. Though this solution is very simple, it is also clearly very constricting.

The image can be downscaled during opening. Many publications about image resizing and scaling can be found in article and patent databases. Reducing the image size during decoding and opening allows larger images to be opened. Such a solution is used, for example, in the current Nokia® Series60 image viewer. The image is downscaled during decoding, to match the displayed image size as closely as possible. Depending on the encoded image format, scaling can be done sometimes very effectively [U.S. Pat. No. 6,067,384]. However, solutions of this kind may limit the available resizing factors to a few predetermined values. Some formats require standard resizing procedures, which are not able to utilize encoding properties to reduce processing complexity, though these procedures can be still applied at the same time as the image pixels are read from the image source. The same approach can be modified to be suitable also for streaming type input. The drawback of this approach is its inflexibility in supporting various levels of resizing, i.e. downscaling, zooming, and panning. For example, when a larger zoom ratio than the initial opening zoom ratio is wanted, the image must be re-opened. This takes more time, due to the series of re-openings and at some point the system may run out of memory.

The insufficient or poor visibility of images can be enhanced by adjusting the image manually. For example, the user can modify the contrast and saturation of the image. However, this is quite inconvenient, as the adjustments must be made individually for each image. In addition, the user is required to have some experience of image processing. A more advanced solution to the enhancement of the appearance of images is to use automatic image adaptive and display specific enhancements [WO03083775]. For example, histogram-analysis-based contrast and color contrast algorithms can be applied [U.S. Pat. No. 6,148,103]. A proper sharpening algorithm [WO2004/036449A1] too may produce a more satisfactory impression of image quality. Finally, the image appearance on a specific display can be optimized by display-specific compensations and processing, such as color management and dithering [US2003179393]. The algorithms in the enhancement chain can be also modified or combined in effective and robust co-operation, for example, sharpening and contrast enhancement can be combined [EP1242975]. Many references related to individual enhancement algorithms can be found in publication and patent databases.

The main problems related to the prior-art solutions are:

Out of memory: The image to be viewed is too large to fit into the available memory. The system may run out of memory immediately during opening, if downscaling during decoding is not used. Even if downscaling is included in decoding, the amount of memory may be insufficient for re-opening during zooming.

Artifacts due to a deficient downscaling algorithm: Scaling algorithms require that the input image for the algorithm is the best possible. Images already scaled using an incompatible process will not be optimal input for scaling algorithms. Proper downscaling also requires some spatial filtering to be included in the scaling process. The lowest level method, called nearest neighbor, does not include filtering. It senses processing power very effectively, but its lack of filtering produces annoying aliasing artifacts relating to the high-frequency content of images. Despite the use of a filtering downscaling algorithm during decoding, artifacts may occur if the scaling algorithm does not support an accurate scaling ratio to display size. Also downscaling to display size after zooming and re-opening may produce aliasing artifacts, if another re-opening with downscaling is not performed. Another artifact related to scaling is blurring, which occurs if too powerful filtering is used. Both aliasing and blurring are especially harmful if the image is going to be enhanced with a sharpening algorithm. These artifacts may decrease the quality of the sharpening, or prevent its use completely.

Artifacts due to a deficient zooming algorithm: The simplest frequently used zooming algorithm is called pixel copy. In this algorithm the input pixels are repeated, to form a larger image. The pixels of the resulting image are seen as larger squares, instead of as individual pixels. The originally smooth edges also become jagged. A better algorithm with some spatial filtering method is therefore required.

Changes in response time: Image downscaling during opening causes a series of re-openings if the downscaling or zooming ratio is changed. Because the image opening, image reading from file system, and image decoding are very time-consuming processes, the response time of the system increases abruptly when re-opening is performed.

Lack of enhancement or inadequate enhancement quality: Non-optimal construction of the complete processing chain may produce poor enhancement quality or prevent the use of enhancements. For example, image-scaling artifacts may destroy the sharpening operation, if proper scaling algorithms are not used. In addition, processing power resources may prevent the use of complex enhancement algorithms.

Slow operation of enhancements: Processing power may be insufficient for an acceptable processing time, if enhancements are not implemented optimally.

Slow operation or insufficient quality of the entire processing chain: The entire image-processing chain may be non-optimally built for mobile use and the mobile environment. The problems can be solved with the invented method:

OBJECTIVES AND SUMMARY OF THE INVENTION

The invention is intended to achieve an improvement relative to the level of the prior art and avoid the drawbacks of the known methods. The characteristic features of the method according to the invention are stated in Claim 1, the characteristics of the system are correspondingly stated in Claim 10, and the characteristics of the software means correspondingly in Claim 15.

The use of the invention achieves the following advantages

Memory consumption: In the invented system the image is always opened in the original source image size or in the largest possible size permitted by the amount of available memory, but not exceeding it. Due to this, out of memory does not happen. The limiting to the largest possible size is done using downscaling during opening. The downscaling to the display size is done separately using a downscaling algorithm of sufficient quality. When greater zooming ratios are requested re-opening is not done, but the image is resized with a zooming algorithm of sufficient quality. It is thus possible to achieve large zooming ratios without running out of memory. In an alternative arrangement, the image can also be initially opened to some size other than the largest possible size. However, due to the use of a second downscaling algorithm, the opening sizes are not determined by the downscaling or zooming ratios. Therefore the number of re-openings and their occurrence can be controlled.

Resizing quality: The best possible downscaling and zooming algorithms can be used, because the opened image size is not determined by the downscaling or zooming factor. The opened image can be the best possible within the limits of the available memory resources. The optimal opened image permits the use of high-quality second scaling algorithm for viewing images in the displayed size. If the opened image size is limited by the amount of the available memory, the image quality will be limited by the resizing algorithms used, despite a better quality image being available in the image source. However, without limitation the image cannot be shown at all.

Processing speed: The complexity of the resizing algorithm can be varied dynamically. For example, when performing zooming and panning operations, a lower quality fast algorithm is used, until the user has found the correct zoom ratio and panning location. After this, resizing is performed using a better quality algorithm, which may take slightly longer. The same approach can be applied during image opening, to allow fast browsing of images. Immediately after opening, a lower quality version of the image is shown. If the user has found the correct image and stops browsing, the quality is improved.

Processing speed: Because the image is opened in maximum size, zoom & pan operations do not require re-opening. Due to this, abrupt changes in processing time are not noticed. However, alternatively the re-opening sizes can still be defined in the system, for example, if faster initial opening is demanded.

Image quality: With the aid of suitable scaling algorithms, a set of enhancements can be used for enhancing the quality of the displayed image. This permits compensation of inadequate display properties, according to the quality of the viewed image.

Processing speed: Enhancements can be made in a display-size image. In that case, the processing complexity, i.e. the number of processed pixels, can be kept low. The analysis stage for enhancements can also be made from a small-size image and unnecessary re-analysis can be avoided, for example, during zooming and panning.

The invention presents an arrangement for image downscaling during image opening or decoding and a second resizing, which are combined and optimized for co-operation with display specific enhancements. In this arrangement, the image is first downscaled during opening to a size that depends on the available memory. A second downscaling or zooming and panning is applied to the opened image. A set of automatic enhancements and display specific processing is applied to the second, resized image. Two-phase scaling permits the use of complex and better enhancement algorithms, without a risk of exceeding the resource limits. The invention is presented with an enhancement chain, which includes image-adaptive contrast and color-contrast enhancement, sharpening, color management, and dithering. Other algorithms may also be included. In one embodiment, two sets of algorithms are used, a first set for the fast browsing of images (the fast algorithms) and a second set of more accurate scaling for the final viewing. The term fast algorithms refers herein to algorithms that require 10-20% (generally 5-30%) of the processing time required by the better quality algorithms referred to herein.

BRIEF DESCRIPTION OF THE DRAWINGS

In the following, the invention is examined with the aid of the accompanying drawings and examples. In the drawings

DETAILED DESCRIPTION OF THE PREFERRED EMBODIMENTS

Figure 1:
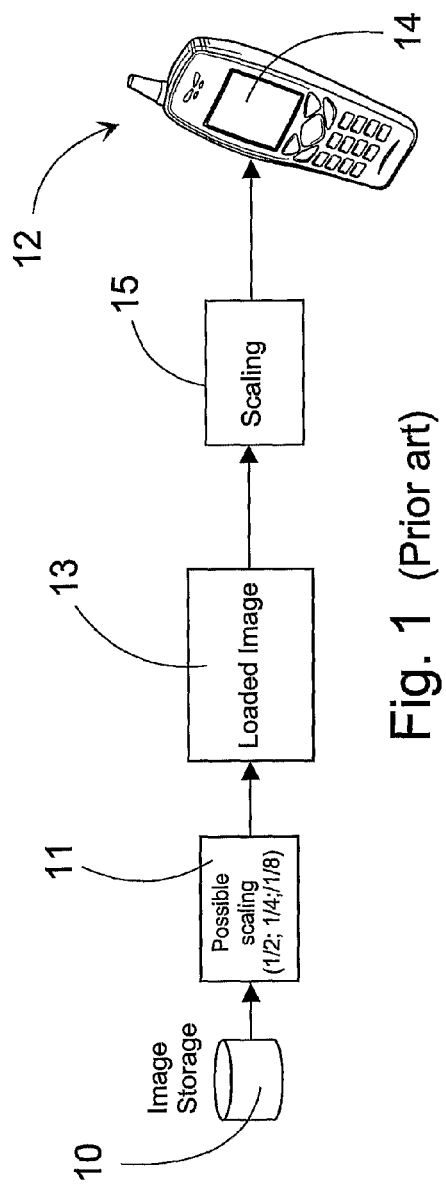
FIG. 1 shows a conventional process for loading and viewing images in a mobile phone

With reference to FIG. 1 a display imaging system according to the prior art implemented in a camera phone 12 is described. In this example images are in a storage 10. This conventional example comprises the first scaling 11 with an integer ratio, opening an intermediate image 13 and, if necessary final, low-quality scaling 15 to the target display 14. The image quality appears to be poor, mainly due to the low-quality scaling. Image enhancement is not used, as it could not help in a low-quality image. Despite of the first scaling, a memory problem may exist if available memory is not checked relative to the intermediate image. The idea of the display chain is to provide an automatic tool to enhance images. The same automatic enhancement is made to all the images to be viewed. Although the display chain is display dependent it is also image adaptive, so that it will work in all images.

Figure 2:
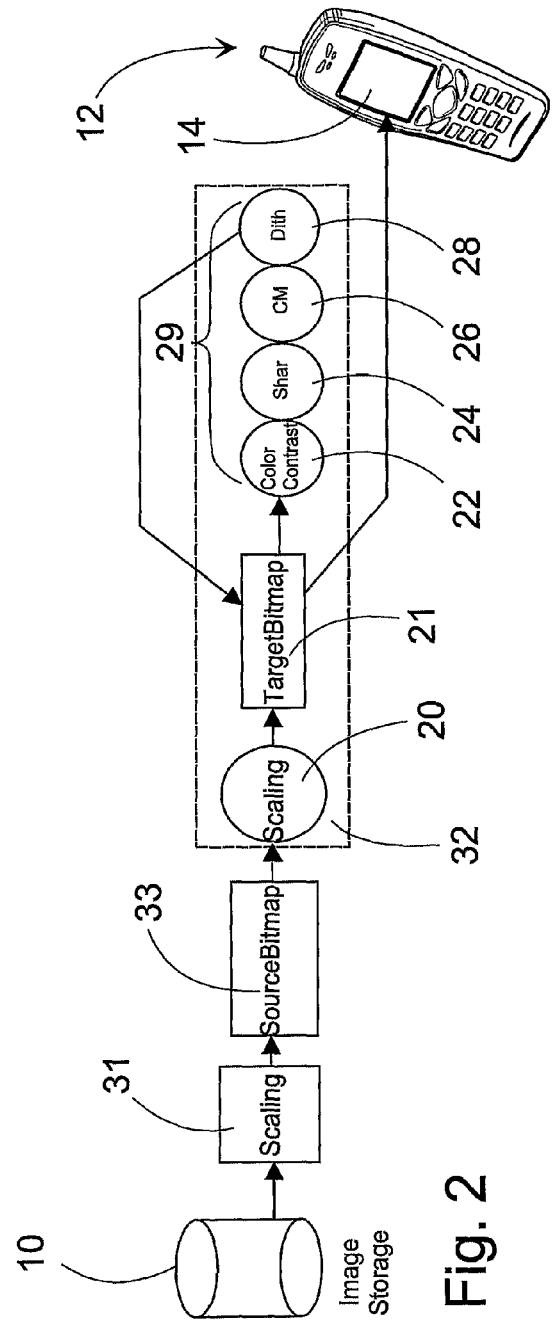
FIG. 2 shows an example of an image-processing chain, according to the invention, for a mobile phone

As can be seen from FIG. 2, the implemented automatic chain replaces the zooming and viewing parts of the original image scaling chain. Similar components, such as the memory 10, the mobile phone 12, and its display 14 are referred to using the same reference numbers as above. The invention combines downscaling 31 during image opening, i.e. decoding, with a second scaling 20 algorithm and an image enhancement chain 29. An image in the memory 10 is scaled 31 and opened as a source bitmap 33 (for example, in a size of 640×480), which is then scaled 20 into a target bitmap 21 for viewing on the display 14. The first scaling 31 is used to limit the opened image size according to the available memory and generally uses a 1:2 scaling ratio. The power n is set to be as low as possible, as long as the image will fit the memory. The amount of available memory is checked before loading. The second scaling 20 is used to resize the image to the displayed image size. The second scaling algorithm supports downscaling to a display-size or smaller image and scaling to images larger than display size, from which a region is panned and cropped for viewing, as well as zooming to image sizes larger than the opened image, from which a region is panned and cropped for viewing. This will be described in detail later.

The advantage of this arrangement is that the amount of allocated memory resources can be controlled. Memory is required for the opened image, which has a limited size, and for the displayed image, the size of which depends on the display size. The displayed image memory can also be allocated directly to the display hardware.

Another advantage is the capability to open and view images of varying sizes, including very large images, without running out of memory.

The image processing chain 32 consists of the second scaling 20 (zooming), and an enhancement chain 29. The scaled image 21 is obtained by the second scaling. In this example the enhancement chain 29 includes four algorithms: color and contrast enhancement 22, sharpening 24, color management 26, and dithering 28. After zooming, the automatic chain is used to enhance the image with a set of algorithms that are intended to compensate for blurring, loss of contrast and colors, etc. The compensation is optimized for a certain display and for the defects caused by the display, or by image features that are not suitable for this display. The defects can be caused, for example, by the camera sensor and optics and the transflective display. The compensation may be applied in the following ways, depending on the display:

A Low contrast display (low color gamut)→Strong contrast enhancement is applied
B Display with a low saturation→Strong saturation enhancement is applied
C Small pixel display with low contrast→Strong sharpness enhancement is applied
D Color management depending on the color spaces of the image and the display
E Dithering according to the image depth of the display Especially enhancements A, B, and C are image adaptive. Thus, if images lack the same features as the display, these enhancements are stronger.

Sharpening is used to enhance the edges. A small pixel size and low contrast enables strong sharpening. Color and contrast enhancement makes the colors look more subjectively pleasant, by enhancing color contrast and saturation automatically. Color management improves the representation of the colors on the display used, when the image color space does not equal the display color space. Dithering reduces the contouring effect caused by the quantization of the display. It is very necessary in low-depth (8-12 bit) displays.

The second scaling 20 is executed separately and all other enhancements are made to the target bitmap 21 (FIG. 2), which can be either the display memory (buffer) or another memory area. First an image in the memory 10 is opened and downscaled 31 to the maximum available size limited by the amount of free memory (generally 25-100% of the maximum amount) and a source bitmap 33 is obtained. The downscaling can utilize fast algorithms that are specific to certain image formats. The image can also be opened without downscaling if sufficient memory resources are available. Thus the opened image always has the largest available size and the best possible quality. The second scaling algorithm 20 scales the image to the display size and a target bit image 21 is obtained. Very often the whole image is required to be seen and the second scaling algorithm uses a downscaling ratio defined by the displayed image size and the opened image size. However, it is also very common to want so see some details of the image. The second scaling algorithm can also use a larger scaling ratio and crop the region of interest from a downscaled image that is larger than the displayed image. The region of interest can be panned inside the downscaled image. It should be noted that the scaling algorithm can implement the panning and cropping in such a way that memory need only be allocated for the displayed part of the image. Once again, this memory may also reside in the display hardware, which in any case needs memory resources for showing the image. The scaling algorithm is not limited to only downscaling, but also supports zooming. This makes possible to achieve the original image size and even larger sizes. The image need not be re-opened if the user changes the downscaling or zooming ratio. This ensures fast operation without abrupt changes in response time. However, if a cropped image is zoomed more than permitted by the intermediate image, the original image can be partially opened. The system also permits the initial use of a smaller limit than that specified by the available memory resources. This can be used for a fast first opening of the image. In this case too, the number of re-openings can be controlled.

Figure 3:
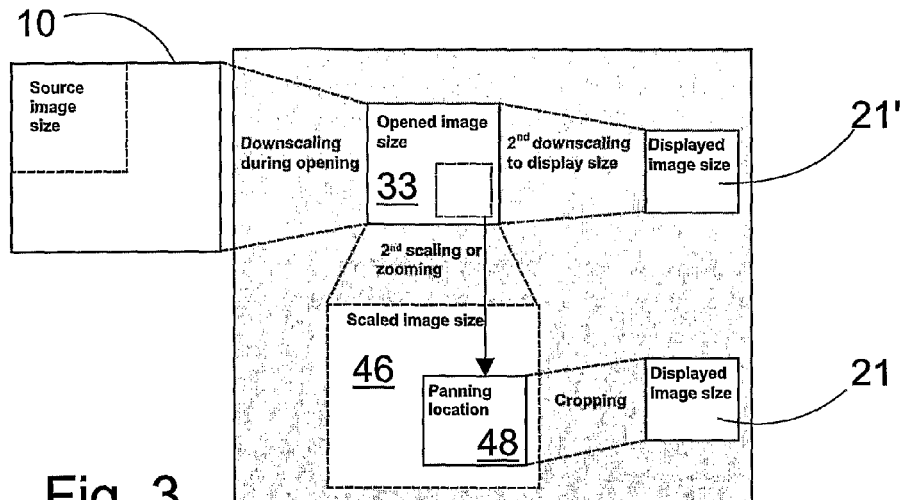
FIG. 3 shows the principles of the two-phase scaling and processing of an image

One example of an image-scaling process will now be described in greater detail, with reference to FIG. 3. A source image 10 is first downscaled and opened as an intermediate image 33. This can be straightforwardly downscaled again into a displayed image 21' (using, in addition, the enhancement chain, as in FIG. 2). Alternatively, the intermediate image 33 can be up-scaled to another intermediate (virtual) image 46, which is panned (panning window 48) and then cropped with enhancements to form the final image 21 for display.

The downscaling and zooming algorithm that is used is not limited by the invented arrangement. However, the quality of the algorithm must meet the specified requirements. The algorithm can also be switched dynamically. For example, a very fast, but not so high quality scaling method can be used for fast browsing of images in the memory 10. In one embodiment, fast algorithms are used and the enhancements can be omitted until a user selects an image, which is then downscaled with a better algorithm and all enhancements are executed. A good-quality image is displayed. Then in another mode the user starts panning of the image with a chosen panning window. Again another fast algorithm is used and enhancements may be omitted until the user selects more precisely the target he/she wants to see. Once the user has found the image or region of interest, the quality can be increased by reprocessing the image with a better scaling algorithm and by using the enhancement chain.

Figure 4:
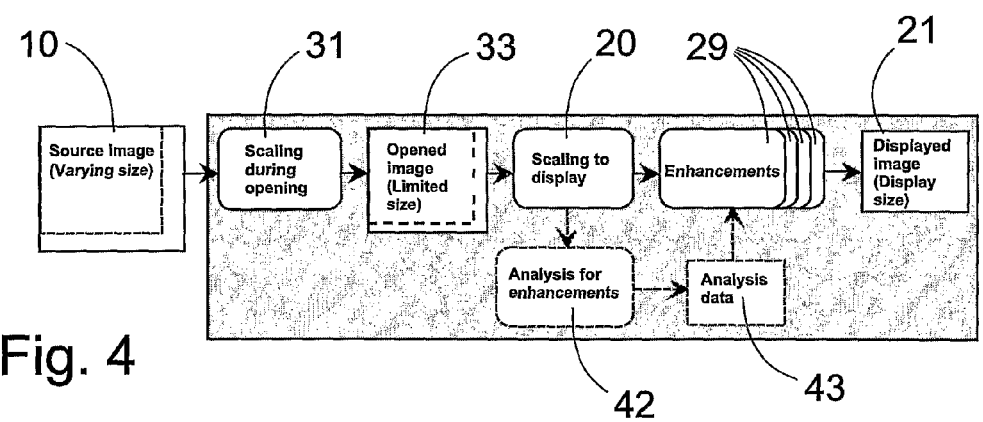
FIG. 4 shows a complete image-processing chain with post-processing image enhancement

The invented arrangement becomes even more advantageous when enhancements are applied to the displayed image. FIG. 4 shows an example of the complete arrangement comprising resizing algorithms and enhancements with image analysis. The same reference numbers as above are used for functionally similar parts. With enhancements, the subjective quality of the displayed image can be improved significantly. In this case, a source image 10 is scaled 31 during opening and an intermediate image 33 is obtained. This is then scaled 20 to the display. Referring now to FIG. 2, an example set of suitable enhancements 29 for a display specific processing chain is:

Color and contrast enhancement (22)
Sharpening (24)
Color management (26)
Dithering (28).

Color management and dithering are very display-specific operations. The parameters of processing depend heavily on the display features. Sharpening and color and contrast enhancements are also image dependent. Image-adaptive algorithms produce the best results. However, these algorithms too can be controlled on the basis of the display properties. Thus the complete chain is display specific.

Sharpening and dithering are examples of spatial operations. Spatial operations should be executed on an image in the displayed size, i.e. they must be located after all the scaling operations. Otherwise, because resizing changes the spatial information of the image, it will also destroy the operation of these algorithms and severe artifacts may be produced. Sharpening is also a good example of algorithms that demand resizing algorithms of a specific quality, even if those are applied before sharpening. In practice, lowest level resizing, i.e. pixel copy or nearest neighbor algorithms, prevents the use of sharpening. Contrast and color enhancement and color management are examples of pixel-based operations, which are not so sensitive to changing the spatial appearance of the image with other algorithms, such as resizing. The optimal order of the algorithms depends on the details of the implementation.

The presented arrangement permits the effective implementation of the enhancement chain. All enhancements can be applied to an image with a small display size. This reduces the number of processed pixels, and consequently minimizes the demand for processing power. The analysis 42 for image-adaptive enhancements can also be made from the small image. If the analysis data 43 is kept in the memory, the analysis need only be done if the image changes. For example, the image can be analyzed after the first opening and re-analysis after zooming or panning is not needed. This reduces the processing time significantly.

Figure 5:
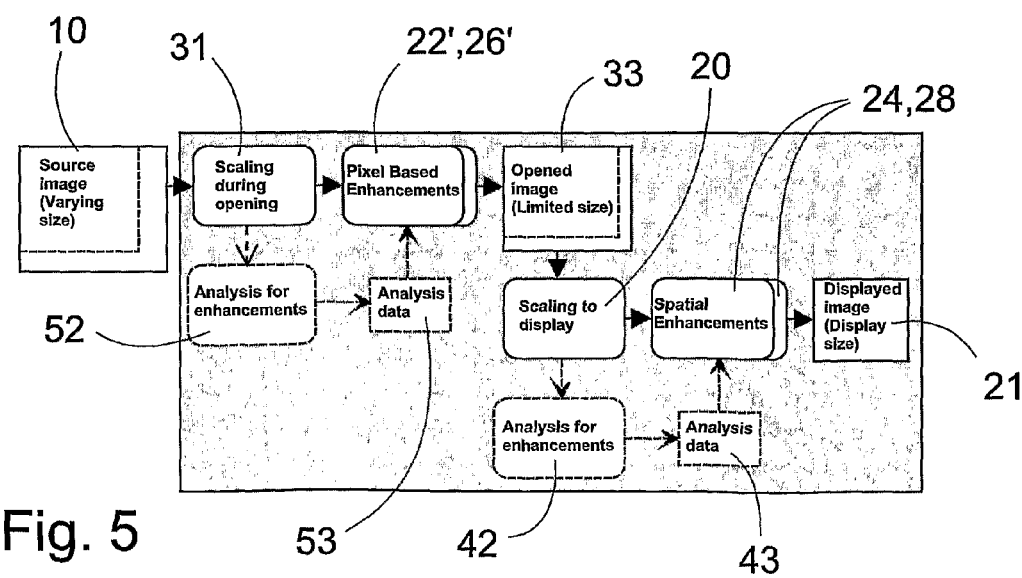
FIG. 5 shows a modification of the processing chain shown in FIG. 4.

The pixel operations, in this case contrast and color enhancement 22', and color management 26', can also be located before the second scaling, as shown in FIG. 5. All the reference numbers representing similar functions and objects are the same as above. During the first scaling 31, the image data is analyzed 52 and analysis data 53 is obtained for the enhancements mentioned above. This increases the number of processed pixels and therefore also the image opening time, but the zooming and panning operations will be faster, due to the reduced number of enhancements. Functionally, the intermediate image 33 now has more information than in the previous examples. Analysis 42, by means of which analysis data 43 is obtained for spatial enhancement and these enhancements 24, 28, will itself remain after the second scaling 20.

Alternatively, analysis data collected within the first scaling could be used after the second scaling (not shown).

It is obvious that one skilled in the art can vary the (prescription)/method according to the invention within wide limits, while nevertheless remaining within the scope of the Claims.

The invention is an arrangement of methods and algorithms for viewing and enhancing images on mobile platforms and displays. The invention describes an effectively implementable system allowing any size of images to be enhanced and viewed on a conventional mobile platform. Examples of such of platforms are the Nokia® Series 30, 60, 40, 80 and 90 platforms targeted for mobile phones with imaging capabilities.

The system for viewing and enhancing images in a mobile device 12 includes a display 14, memory, and a processing means for bit images, and an input device for receiving bit images. The system also includes means for enhancing an intermediate image 33, using an enhancing chain 29. In one embodiment, the processing means include programmable means to run two sets of algorithms, a first set for fast browsing of images and a second, more accurate scaling set for final viewing.

The method according to the invention can be performed using a program product, which consists of a computer-readable memory medium, in which computer-readable program-code components are stored. These consist of:

a first component, to be programmatically implemented, for receiving and scaling a bit flow directly to a selected size, to form a bit image in a first memory area, a second component, to be programmatically implemented, for scaling the said bit image to the display size, in a second memory area, a third component, to be programmatically implemented, for processing part of the bit image in the said second memory area, using image-enhancement algorithms relating to at least two different properties.

In this case, the term computer naturally refers to a mobile station's microprocessor, fixed and/or changeable memory media, and I/O means such as a display and a keypad.

The invention claimed is:
1. A method comprising:
detecting a maximum amount of available memory before opening a received bit image;
if the maximum amount of available memory accommodates the received bit image in an original source image size, then storing the opened received bit image in its original source image size in the available memory;
otherwise, performing a first scaling of the received bit image to produce a scaled and an intermediate bit image of an intermediate size upon opening of the received bit image and storing the intermediate bit image in the available memory; and
performing a second scaling on one of the stored received bit image in its original source image size and the intermediate size to produce a second bit image of a size to be displayed on a display of a mobile device; and enhancing the second bit image to be displayed by using an enhancing chain comprising at least two enhancing algorithms relating to different properties of the image, wherein the first and second scaling are performed using preselected scaling algorithms.

2. The method according to claim 1, wherein the enhancing chain contains at least one of following steps: color and contrast enhancement, sharpening, color management fitting the second bit image to the display's color space, and dithering.

3. The method according to claim 1, wherein the second scaling scales the intermediate bit image to a virtual image of a second size, in which only the displayed part is processed and cut to the display.

4. The method according to claim 3, further comprising panning the virtual image to select the final cut image.

5. The method according to claim 1, further comprising reprocessing the intermediate bit image and/or the final image with a better algorithm once the user has selected the region of interest.

6. The method according to claim 1, further comprising analyzing the image data of the received bit image during the first scaling, thus obtaining analysis data, and using the analysis data after the second scaling for pixel-based enhancing of the image to be displayed.

7. The method according to claim 1, wherein a user browses images cut from one original image, the method comprising opening the intermediate bit image only once and processing the cut images from the same intermediate image.

8. The method according to claim 1, where several images are received and browsed and one is selected for the final viewing, the method comprising using two sets of algorithms, a first set for fast browsing of images and a second, more accurate scaling set for the final viewing.

9. The method according to claim 1, where images are improved programmatically in a mobile station, which includes a display for showing bit images, an input device for receiving bit images, memory, and processing means for the bit images, in which the first scaling occurs, using a selected algorithm, directly from the arriving bit flow, to the intermediate size in a first area of the memory, one of the bit image of original source image size and intermediate bit image is scaled, using a selected algorithm, to the second bit image to be displayed in a second memory area, or in the memory of the display, the method comprising processing the second bit image to be displayed in the said second memory area, or in the display memory, using at least two algorithms, which relate to different properties of the image.

10. An apparatus comprising:
a processor; and
memory embodied with software;
the processor, in conjunction with the memory and the software, configured to cause the apparatus to perform actions as follows:
detect a maximum amount of available memory before opening a received bit image;
if the maximum amount of available memory accommodates the received bit image in an original source image size, then store the opened received bit image in its original source image size in the available memory;
otherwise, perform a first scaling of the received bit image to produce a scaled and an intermediate bit image of an intermediate size upon opening of the received bit image and store the intermediate bit image in the available memory, perform a second scaling on one of the stored received bit image in its original source image size and the intermediate bit image to produce a second bit image to be displayed on a display of the apparatus, by panning and cutting the bit image of the one of the stored received bit image in its original source image size and the intermediate bit image, and enhance the second bit image using at least two enhancement algorithms relating to different properties of the image, wherein the first and second scaling are performed using preselected scaling algorithms.

11. The apparatus according to claim 10, wherein the apparatus comprises enhancement element configured to adjust at least one of following: color and contrast, sharpening, color management fitting the image to the display color space, and dithering.

12. The apparatus according to claim 10, wherein the apparatus comprises a first scaler configured to permit fast browsing of images and a second scaler configured to allow more accurate scaling for final viewing.

13. The apparatus according to claim 10, wherein the apparatus comprises a mobile phone.

14. Program product for implementing the method according to claim 1, which program product includes a computer-readable memory medium, in which computer-readable program-code components are stored, which include:

a first programmatically implemented component for receiving a bit flow and scaling it directly as a bit image of a selected size in a first memory area, a second programmatically implemented component for scaling the said bit image to the display size to a second memory area, a third programmatically implemented component for processing the bit image is the said second memory area, using at least two image enhancement algorithms relating to different properties.

15. A non-transitory computer readable storage medium embodied with a computer program with instructions for performing operations comprising:

detecting a maximum amount of available memory before opening a received bit image;

if the maximum amount of available memory accommodates the received bit image in an original source image size, then storing the opened received bit image in its original source image size in the available memory;

otherwise, performing a first scaling of the received bit image to produce a scaled and an intermediate bit image of an intermediate size upon opening of the received bit image and storing the intermediate bit image in the available memory; and performing a second scaling on one of the stored received bit image in its original source image size and the intermediate size to produce a second bit image of a size to be displayed on a display of the apparatus; and enhancing the second bit image to be displayed by using an enhancing chain comprising at least two enhancing algorithms relating to different properties of the image, wherein the first and second scaling are performed using preselected scaling algorithms.

* * * * *